United States Patent
Kampmann et al.

(10) Patent No.: US 9,344,476 B2
(45) Date of Patent: May 17, 2016

(54) TECHNIQUE FOR CONTROLLING DATA PACKET TRANSMISSION OF VARIABLE BIT RATE DATA

(75) Inventors: Markus Kampmann, Aachen (DE); Christoph Plum, Huckelhoven (DE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 1242 days.

(21) Appl. No.: 11/911,254

(22) PCT Filed: Apr. 11, 2005

(86) PCT No.: PCT/EP2005/003786
§ 371 (c)(1),
(2), (4) Date: Nov. 9, 2007

(87) PCT Pub. No.: WO2006/108435
PCT Pub. Date: Oct. 19, 2006

(65) Prior Publication Data
US 2008/0181221 A1 Jul. 31, 2008

(51) Int. Cl.
*H04L 12/26* (2006.01)
*H04L 12/891* (2013.01)
*H04L 29/06* (2006.01)
(Continued)

(52) U.S. Cl.
CPC ........ *H04L 65/608* (2013.01); *H04L 29/06027* (2013.01); *H04L 47/10* (2013.01); *H04L 47/263* (2013.01); *H04L 47/29* (2013.01);
(Continued)

(58) Field of Classification Search
CPC ..... H04L 65/4092; H04L 47/29; H04L 43/16; H04L 65/60

USPC .......................................................... 709/231
See application file for complete search history.

(56) References Cited

U.S. PATENT DOCUMENTS 7,003,794 B2 * 2/2006 Arye ............................. 725/100
7,536,469 B2 * 5/2009 Chou et al. ..................... 709/231
(Continued)

FOREIGN PATENT DOCUMENTS

WO 99/03225 A 1/1999
WO WO 03/084233 A1 10/2003
(Continued)

OTHER PUBLICATIONS

Rijsinghani; RFC Computation of the Internet Checksum via Incremental Update; May 1994; pp. 1-6; Network Working Group; Digital Equipment Corporation; Littleton, MA, USA.
(Continued)

*Primary Examiner* — Asad Nawaz
*Assistant Examiner* — Jason Harley (57) ABSTRACT

A technique is disclosed for controlling data packet transmissions from a server to a client having a client buffer in accordance with a waiting mode and a dynamic mode. The waiting mode is performed before packets containing data encoded subject to a current bit rate have reached the client buffer; the dynamic mode is performed otherwise. In the waiting mode, down-switches to lower bit rates are allowed but up-switches to higher bit rates are disabled. In the dynamic mode, up-switches and down-switches are both allowed, with adjustments in the bit rate of packets controlled based, in part, on the amount of data contained within the client buffer when packets containing data encoded subject to the current bit rate first reached the client buffer. The two modes help avoid unnecessary rate switches.

23 Claims, 5 Drawing Sheets (51) Int. Cl.
*H04L 12/801* (2013.01)
*H04L 12/825* (2013.01)
*H04L 12/835* (2013.01)

(52) U.S. Cl.
CPC ............... *H04L 47/30* (2013.01); *H04L 65/80* (2013.01); *Y02B 60/31* (2013.01)

(56) References Cited

U.S. PATENT DOCUMENTS

| | | | |
|---|---|---|---|
| 7,542,435 B2* | 6/2009 | Leon et al. | 370/278 |
| 2003/0142744 A1* | 7/2003 | Wu et al. | 375/240.03 |
| 2003/0151753 A1* | 8/2003 | Li et al. | 358/1.9 |
| 2004/0098748 A1 | 5/2004 | Bo et al. | |
| 2004/0177162 A1* | 9/2004 | Wetzel | H04L 29/06 709/248 |
| 2005/0249226 A1* | 11/2005 | Kang | H04N 21/23406 370/412 |
| 2005/0254508 A1* | 11/2005 | Aksu et al. | 370/428 |
| 2006/0165166 A1* | 7/2006 | Chou et al. | 375/240.05 |

FOREIGN PATENT DOCUMENTS

| | | |
|---|---|---|
| WO | WO 03/098935 A2 | 11/2003 |
| WO | 2004/039034 A | 5/2004 |

OTHER PUBLICATIONS

3GPP Organizational Partners; 3GPP-TS-26.233 Transparent End-to-End Packet Switched Streaming Service (PSS) General Description (Release 7); http://www.3qpp.org; Jun. 2007; pp. 1-14; v7.0.0; Valbonne, France.

3GPP Organizational Partners; 3GPP-TS-26.234 Transparent End-to-End Packet Switched Streaming Service (PSS); Protocols and Codecs; (Release 7); http://www.3gpp.org; Sep. 2007; pp. 1-149; v7.4.0; Valbonne, France.

* cited by examiner

TECHNIQUE FOR CONTROLLING DATA PACKET TRANSMISSION OF VARIABLE BIT RATE DATA

CLAIM OF PRIORITY

This application is a 371 of PCT Patent Application No. PCT/EP05/03786, filed Apr. 11, 2005.

FIELD OF THE INVENTION

The invention relates to the communication of data and, more specifically, to a technique for controlling streaming data packet transmissions.

BACKGROUND OF THE INVENTION

Increasing amounts of data are being transmitted from servers to clients via communication infrastructures such as packet-based Internet Protocol (IP) networks. One particular application that is increasing in popularity is multimedia streaming. However, improvements must be made in providing reliable data streams before wide-spread adoption of such services. For example, as data transmission link rates between the IP network and a client device of a user tend to fluctuate, any disturbances in data delivery to the user may result in severe degradation of the playout to the end user, i.e. a degradation in the quality of the media observed by the user. In particular, it is important that there be a sufficient supply of packets of data at the client device to be fetched by a multimedia application as playout (i.e., the display of the multimedia file by the multimedia application or player) progresses.

In many cases, the packet transmission rate cannot be changed, as this rate depends upon the bandwidth of communication link (or it is at least impractical to change the packet transmission rate). However, the rate at which data is fed to the output device of the user often must be changed. Typically, for streaming applications, such adjustments are achieved using "stream switching". With stream switching, the same media content, e.g. a particular video sequence, is pre-encoded at different bit rates and stored at the server. Hence, different versions of the same stream are available. During transmission, the server selects the particular version that has a data bit rate most appropriate based upon the current available bandwidth in the network and based upon the status of the client buffer. Switching logic employed by the server decides if and when to switch to another version of the stream. In the case of a so-called "down-switch", the stream is switched to a version with a lower encoded bit rate. In the case of an "up-switch", the switch is made to a version with a higher encoded bit rate. In many implementations, the criteria for switching employs predefined thresholds defined with respect to client buffer status. In one example, thresholds are based upon a buffer fill level, which represents the amount of data within the client buffer in bytes. In another example, the thresholds are based upon a playout length (PT) of stored media in the client buffer, which represents the amount of time in seconds it will take for the data already within the client buffer to be played out to the user. Herein, examples involving playout length are described, though buffer fill level or other appropriate parameters can instead be used.

Some conventional techniques for determining the status of the client buffer utilize information within Real Time Transport Control Protocol (RTCP) receiver reports (RRs). Information pertaining to the next sequence number (NSN) or oldest buffered sequence number (OBSN) within the client buffer and the highest received sequence number (HRSN) within the client buffer is contained with the RR and is used to determine the consumed buffer space as the size of each packet within the range from the HRSN to the NSN/OBSN is known. If the free space within the client buffer is below a preferred client buffer fill level, then a different version of the stream is selected. For example, if buffer playout length (PT) falls below a predetermined minimum threshold ($PT_{DOWN}$), then a risk of buffer draining occurs, i.e. the client buffer becomes empty such that there is no data to stream to the user. This results in a playout freeze, wherein the last image displayed to the user is typically frozen until a sufficient amount of additional data can be added to the client buffer to restart the stream to the output device employed by the user, i.e. a "rebuffering" of the client buffer is required. Rebuffering can be extremely annoying from the standpoint of the user.

To avoid possible rebuffering due to client buffer draining, the server detects when the playout length (PT) within the client buffer drops below threshold $PT_{DOWN}$, then adjusts the bit rate (i.e. selects a version of the stream having a different bit rate) in an attempt to prevent the client buffer from becoming completely drained. More specifically, the server performs a down-switch, i.e. a switch to a lower bit rate stream. The reason that a down-switch is performed, rather than up-switch, is that the most likely reason that the client buffer is being drained is that the link rate between the server and the client buffer is less than anticipated, i.e. the effective bandwidth is less than needed for the bit rate currently being used. As a result, data is not being received by the client buffer at the same rate at which the client buffer is feeding data to the output device of the user. Hence, the client buffer, which should remain fairly well populated with data, becomes drained. By switching to the lower bit rate, the client buffer feeds data to the display unit at a lower rate, thereby allowing more time for data to be received from the server, and thereby preventing the client buffer from becoming completely drained. From the standpoint of the user, the quality of the media stream is downgraded because of the down-switch, e.g. the size of the displayed image of the video stream becomes smaller, the resolution of the image becomes less, or higher distortions are observed in the image. Yet, this is preferable to the aforementioned playout freeze that occurs during rebuffering.

On the other hand, if buffer playout (PT) length exceeds a predetermined maximum threshold ($PT_{UP}$), then a risk of buffer overflow occurs, i.e. the client buffer becomes full such there is no room for additional packets. Any packets received by the client buffer but not stored therein are typically not re-sent by the server and hence the data of those packets are simply not forwarded to the output device of user. Once the client buffer is again capable of storing packets, the data stream resumes with the new packets. Thus, from the standpoint of the user, there is a sudden loss of content as the stream simply jumps ahead. In the case of a film or movie, dialogue can be lost, thus interfering with the ability of the user to follow story. In the case of music, the song simply jumps ahead. As will be appreciated, this can be quite annoying from standpoint of the user as well.

To avoid a disruption of the stream due to client buffer overflow, the server detects when the playout length (PT) within the client buffer exceeds threshold $PT_{UP}$ and then performs an up-switch, i.e. a switch to a higher bit rate stream. The reason that an up-switch is performed, rather than down-switch, is that the most likely reason that the client buffer is becoming to full is that the link rate between the server and the client buffer is greater than anticipated, i.e. the effective bandwidth is greater than needed for the bit rate currently being used. As a result, data being received by the client buffer at a rate higher than the rate at which the client buffer feeds the data to the output device of the user. Hence, the client buffer overflows. By switching to the higher bit rate, the client buffer feeds data to the output device at the higher rate, thereby preventing the client buffer from overflowing. From the standpoint of the user, the quality of the media stream is improved due to the up-switch, e.g. the size of the displayed image of the video stream becomes larger or the resolution of the image becomes greater. Hence, the up-switch helps prevent interruption of the stream and improves media quality, which both benefit the user.

Simple logic for performing up-switches and down-switches may be represented as follows:
If $PT>PT_{UP}$ then
    Perform up-switch
else if $PT<PT_{DOWN}$
    Perform down-switch
end if.

Appropriate selection of these thresholds is critical to the overall media impression of the user. In the case of down-switch that is performed too late, a rebuffering event will happen. In the case of an up-switch that is performed too late, the user receives a lower quality media then is otherwise necessary and, as noted, a break in the data stream may occur as the result of a buffer overflow. Likewise, if a down-switch is performed earlier than necessary, the user receives a lower quality media than is otherwise necessary. If an up-switch is performed earlier than necessary, a down-switch may then soon be required, resulting in annoying fluctuations in the quality of the media. To avoid these problems, multiple down-switch thresholds and multiple up-switch thresholds can potentially be used. As playout length decreases towards buffer drainage, a series of the down-switch thresholds are crossed, each triggering a down-switch. Conversely, as playout length increases towards buffer overflow, a series of up-switch thresholds are crossed, each triggering an up-switch.

However, after a switch has occurred and a stream with the new bit rate has been transmitted, it takes some time before the switch has any effect on the playout length of the client buffer. First, there is a transmission delay until a first packet containing data encoded at the new rate reaches the client buffer. During this time period, the playout length of the stored media in the client buffer is unaffected by the new rate. Hence, if the playout length was increasing toward a possible buffer overflow, it will likely continue to increase. Conversely, if the playout length was a decreasing toward possible buffer drainage, it will likely continue to decrease. Also, even after the arrival of the first packet at the new bit rate, the playout length may change only slowly at first. For example, there may still be some packets sent with data at the previous bit rate that had not yet been received by the client buffer. Therefore, the switching conditions are often still valid and several switches then follow a first switch, which are often unnecessary. In the case of a first down-switch, several further down-switches may be performed, resulting in a stream bit rate that is much lower than necessary. Often, the down-switches do not stop until the lowest stream bit rate has been selected. This behavior results in an unnecessarily low media stream quality for the user. In the case of an up-switch, several further up-switches can happen, resulting in a stream bit rate that is too high, often to the highest rate possible. This results in a stream bit rate that is much too high compared with the current available network bandwidth, triggering a series of down-switches.

As a result, frequent and annoying variations in stream quality are observed by the user. Moreover, if a bit rate that is much too high has been selected, subsequent down-switches often cannot be executed fast enough, resulting in annoying rebuffering events and playout freeze. Likewise, if a bit rate that is much too low has been selected, subsequent up-switches often cannot be executed fast enough, resulting in annoying buffer overflows and associated loss of data. Even with only a single up-switch threshold and a single down-switch threshold, these sorts of problems can arise, particularly if the thresholds are set too close together.

Even more problems can arise when transmitting media content that has a variable bit rate. Conventionally, each pre-encoded version of the multimedia stream has a single bit rate, and hence the bit rate of a stream only changes if the server switches to a different stream having a faster or slower rate, as already described. However, in some cases, it is appropriate to provide streams with a varying bit rate, particularly to accommodate storage and transmission of large media files. In other words, each version of a stream may have portions at one bit rate and other portions at another. Preferably, the bit rate for individual sections of a particular version of a stream is chosen based on the content of the individual section. For example, one portion of a stream may be fairly static, permitting a low bit rate to adequately capture the content. Thereafter, a higher bit rate may be needed to adequately capture more dynamic content. By setting the bit rate of each portion of a multimedia stream based on the dynamic content of that portion of the stream, overall file size can be reduced while still adequately conveying the content.

When applying conventional stream switching techniques to variable bit rate streams, various problems can arise. In particular, the changing bit rates of the stream can compound the aforementioned problems, resulting in even more frequent and unnecessary switches, causing further annoyance to the user and, often, wasting bandwidth.

Accordingly, there is a need for an improved technique for controlling stream switching of variable bit rate data so as to provide more stable and reliable content to user, and it is to this end that the invention is principally directed.

SUMMARY OF THE INVENTION

The invention may be embodied in a method for controlling packet transmissions of variable bit rate data from a server to a client having a client buffer wherein the server switches among different versions of a stream of variable bit rate data being transmitted based on a status of the client buffer. In accordance with the method, an initial version of a stream of variable bit rate data is selected for transmission and a value (PT) representative of an amount of data within the client buffer is tracked. A bit rate (BR) of a portion of variable bit rate data yet to be transmitted within the selected version of the stream is determined. Then, switches to different versions of the stream, having different mean bit rates, are controlled by the server based on the value (PT) representative of the amount of data within the client buffer in combination with the bit rate (BR) of the portion of variable bit rate data yet to be transmitted.

In one example, the bit rate ($BR_{NEXT}$) of the next sequential portion of data to be transmitted is determined. If a $BR_{NEXT}$ exceeds an average bit rate ($BR_{AVE}$), then the step of controlling switching is performed to delay any switch to a version of the stream having a generally higher bit rate, i.e. up-switches are delayed.

In another example, if $BR_{NEXT}$ exceeds the average bit rate ($BR_{AVE}$), the step of controlling switching is performed to expedite any switch to a version of the stream having a generally lower bit rate, i.e. down-switches are expedited.

In yet another example, if $BR_{NEXT}$ is below the average bit rate ($BR_{AVE}$), the step of controlling switching is performed to expedite any switch to a version of the stream having a generally higher bit rate, i.e. up-switches are expedited.

In a preferred implementation, the server controls switches to different versions of the stream based on a current status of the client buffer by applying one or more thresholds to data already in the client buffer. The step of controlling switching is performed by dynamically adjusting the one or more thresholds based on the bit rates (BR) of the portion of variable bit rate data to be transmitted and then determining whether to switch to a different version of the stream by applying the one or more adjustable thresholds to the value (PT) representative of the amount of data within the client buffer.

In an example of the preferred implementation, the one or more thresholds include an up-switch threshold ($PT_{UP}$) and a down-switch threshold ($PT_{DOWN}$). The step of dynamically adjusting the one or more thresholds is performed by determining an average bit rate ($BR_{AVE}$) of the variable bit rate data and then selectively adjusting is the up-switch and down-switch thresholds ($PT_{UP}$ and $PT_{DOWN}$) based on a comparison of the bit rate ($BR_{NEXT}$) of a next portion of variable bit rate data to be transmitted with the average bit rate ($BR_{AVE}$) of the variable bit rate data. The step of selectively adjusting the up-switch and down-switch thresholds includes the step of increasing the up-switch and down-switch thresholds ($PT_{UP}$ and $PT_{DOWN}$) if the bit rate ($BR_{NEXT}$) of the next portion of variable bit rate data exceeds the average bit rate ($BR_{AVE}$). The step of selectively adjusting the up-switch and down-switch thresholds also includes the step of decreasing the up-switch threshold ($PT_{UP}$) if the bit rate ($BR_{NEXT}$) of the next portion of the variable bit rate data is below the average bit rate ($BR_{AVE}$) and if the up-switch threshold ($PT_{UP}$) exceeds the down-switch threshold ($PT_{DOWN}$). In other words, $PT_{UP}$ is not adjusted downwardly if it would then fall below $PT_{DOWN}$.

In the preferred implementation, the step of increasing the up-switch and down-switch thresholds ($PT_{UP}$ and $PT_{DOWN}$) if the bit rate (BR) of the next portion of variable bit rate data exceeds the average bit rate ($BR_{AVE}$) is performed by determining the bit rate ($BR_{NEXT}$) of the next portion of variable bit rate data then calculating a ratio (F) of the bit rate ($BR_{NEXT}$) of the next portion of variable bit rate data to the average bit rate ($BR_{AVE}$). The up-switch and down-switch thresholds ($PT_{UP}$ and $PT_{DOWN}$) are then multiplied by the ratio (F) to thereby increase the thresholds. The step of decreasing the up-switch threshold ($PT_{UP}$) is also performed by determining the bit rate ($BR_{NEXT}$) of the next portion of variable bit rate data and then calculating a ratio (F) of the bit rate ($BR_{NEXT}$) of the next portion of variable bit rate data to the average bit rate ($BR_{AVE}$). The up-switch threshold ($PT_{UP}$) is then multiplied by the ratio (F) to thereby decrease the threshold. Then, the larger of the decreased up-switch threshold ($PT_{UP}$*F) and the down-switch threshold ($PT_{DOWN}$) is selected for use as a new up-switch threshold.

In various implementations, the values representative amounts of data within the client buffer are representative of playout lengths (PT) of the data or buffer fill levels. The average bit rate ($BR_{AVE}$) may be representative of an average bit rate over the entire version of the stream being transmitted or may instead be representative of an average bit rate of data that has already been transmitted within the version of the stream being transmitted.

Depending on the implementation, the client may be a mobile communications terminal such as a mobile telephone, and in addition, or in the alternative, the server may be integrated into a mobile communications terminal so that the link between the server and the network may be wireless. In addition, the method according to the present invention may be performed by one or more intermediary network nodes (such as proxies) arranged between the server and the client. The method may also be utilized in architectures having plurality of data streams being buffered by the client buffer (or multiple client buffers depending on the configuration of the client).

The invention may also be embodied in a computer program product, which may be stored on a computer readable recording medium, comprising program code portions for performing any of the steps of the above methods when the computer program product is run on a computer system.

The invention may further comprise an apparatus comprising a computer processor and a memory coupled to the processor, where the memory is encoded with one or more programs that may perform any of the steps of the above methods.

In yet another embodiment, the invention relates to an apparatus for controlling packet transmissions of variable bit rate data from a server to a client having a client buffer wherein the server switches among different versions of a stream of variable bit rate data being transmitted based on a status of the client buffer. The apparatus comprises: an anticipatory variable bit rate stream transmission controller for selecting an initial version of a stream of variable bit rate data for transmission; a client buffer monitor for tracking a value representative of an amount of data within the client buffer; a variable bit rate determination unit a bit rate (BR) of a portion of variable bit rate data yet to be transmitted within the selected version of the stream; and wherein the anticipatory variable bit rate stream transmission controller then controls switches to different versions of the stream, having different mean bit rates, based on the value (PT) representative of the amount of data within the client buffer in combination with the bit rate (BR) of the portion of variable bit rate data yet to be transmitted The apparatus may be configured as a fixed or mobile network component, such as a network server and/or a wireless terminal. In addition, the apparatus may be constituted by an intermediary network node, such as a proxy.

BRIEF DESCRIPTION OF THE DRAWINGS

In the following the invention will be described with reference to exemplary embodiments illustrated in the figures, in which.

DETAILED DESCRIPTION OF THE PREFERRED EMBODIMENTS

In the following description, for purposes of explanation and not limitation, specific details are set forth, such as particular sequences of steps and various configurations, in order to provide a thorough understanding of the invention. It will be apparent to one skilled in the art that the invention may be practiced in other embodiments that depart from these specific details. Moreover, those skilled in the art will appreciate that the functions explained herein below may be implemented using software functioning in conjunction with a programmed microprocessor or general purpose computer, and/or using an application specific integrated circuit (ASIC). It will also be appreciated that while the invention is primarily described as a method, it may also be embodied in a computer program product as well as a system or apparatus comprising a computer processor and a memory coupled to the processor, where the memory is encoded with one or more programs that may perform the methods disclosed herein.

Figure 1:
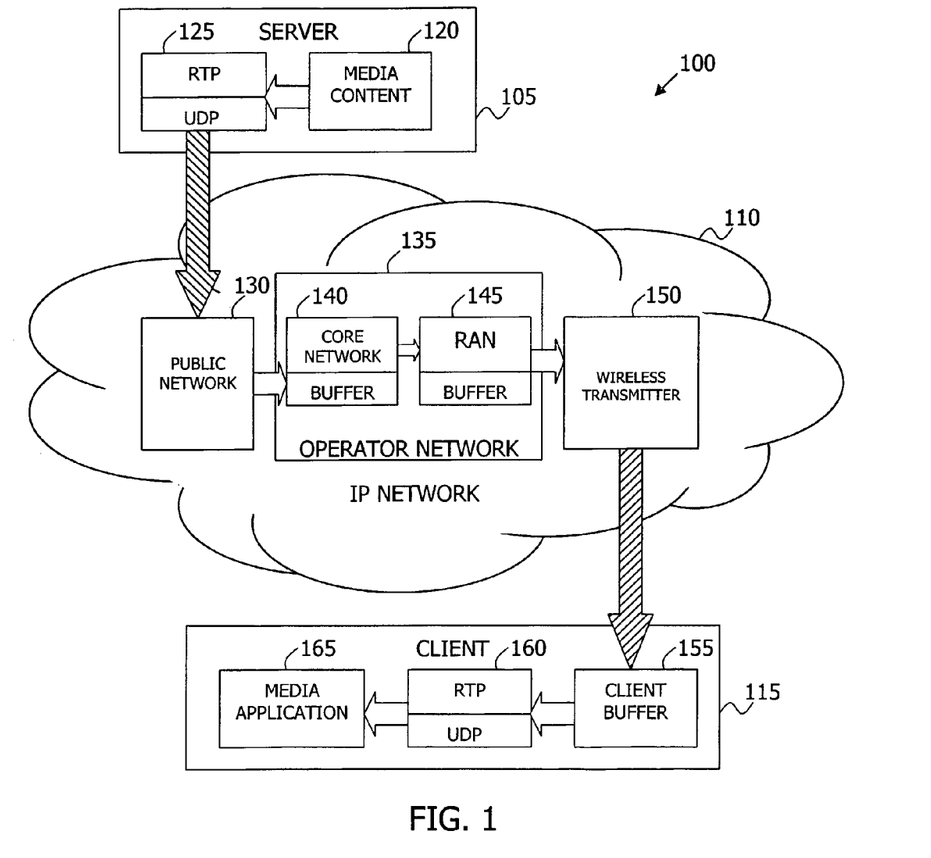
FIG. 1 is a schematic diagram of a communication system useful for understanding and implementing the invention.

FIG. 1 illustrates a sample architecture 100 that may be used in connection with the invention including a server 105 that may be coupled to a client 115 via a communications pathway such as an IP network 110. The server include a media content module 120 that accesses and transmits certain media content (e.g., multimedia data files) via a RTP/UDP module 125 using a streaming standard such as RTP (Real time Transport Protocol) over UDP or other data transport protocol for managing the realtime transmission of multimedia data (with a transport layer protocol such as UDP—User Datagram Protocol). The packets are transmitted to a public network 130 (e.g., the Internet, however, an external public network is not required when the server is directly coupled to the operator network 135) that delivers the packets to an operator network 135, such as a mobile communications operator "wired" network, coupled thereto.

The operator network 135 includes a core network 140 that provides communication links between the server 105 and the client 115. The core network 140, which may optionally have a buffer, provides the packets received from the RTP/UDP module 125 for buffering in a buffer within a radio access network (RAN) 145 (such as a buffer in the SGSN or in the RNC) prior to their transmission by a wireless transmitter 150. The buffers of the core network 140 (if buffering is utilized) and the RAN 145 are arranged in series and constitute a network buffer.

The client 115 receives the packets transmitted by the wireless transmitter 150 in a client buffer 155. The packets are transferred from the client buffer 155 to a RTP/UDP module 160 for delivery to and use by the media application module 165 (or multimedia player). For purposes of this application, the phrase "packet transmission rate" will refer to the rate of transmission of packets from the server 105 to the IP network 110, the phrase "link rate" will refer to the rate of transmission of packets from the IP network 110 to the client 115, and the phrase "content rate" shall refer to the rate that data is transferred from the client buffer 115 to the media application module 165 for playout by the media application module 165.

Figure 2:
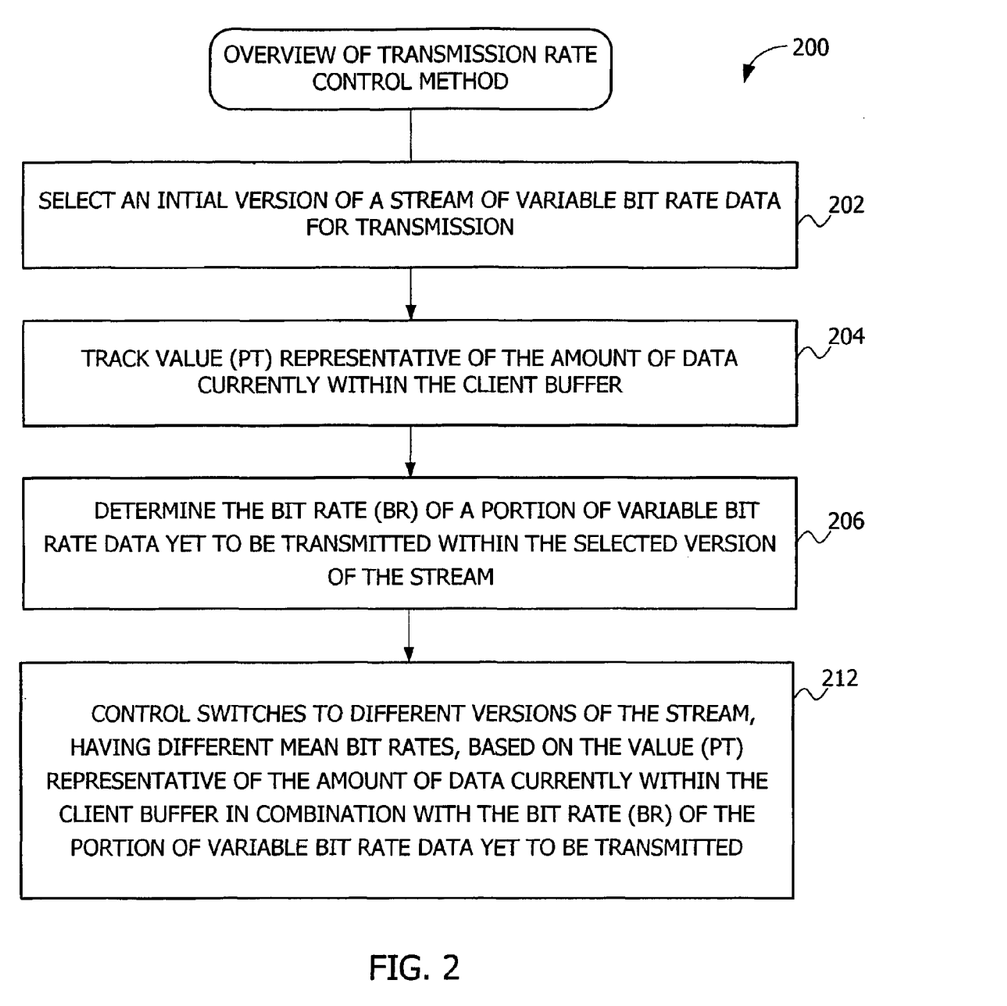
FIG. 2 is a process flow diagram providing an overview of a method embodiment of the invention.

With reference to FIG. 2, a method embodiment 200 of the invention is illustrated which may be performed, for example, by the system of FIG. 1. The method is preferably implemented by the server, such as a server 105 of FIG. 1, but may be implemented by any other appropriate network component. In the following descriptions, it will be assumed that a server implements the steps of the method. Beginning at step 202, the server selects an initial version of a stream of variable bit rate data for transmission. The initial version of the stream is selected, in accordance with otherwise conventional techniques, from among a group of different versions of the stream having generally different pre-encoded transmission rates. For example, a first stream may begin with a bit rate of 1 megabit (Mbit)/second, whereas a second stream may begin with a bit rate of 2 Mbits/second. Since the stream itself has a variable bit rate, each version of the stream likewise has a variable bit rate. Hence, whichever version of the stream is selected, the bit rate of data encoded within the stream will change. For example, the first version of the stream may switch to a bit rate of 2 Mbits/second after ten seconds, whereas the second version of the stream may switch to a bit rate of 3 megabits Mbits/second after ten seconds, i.e. both versions of the stream have pre-encoded bit rates that increase by 1 Mbit/sec after ten seconds.

Figure 3:
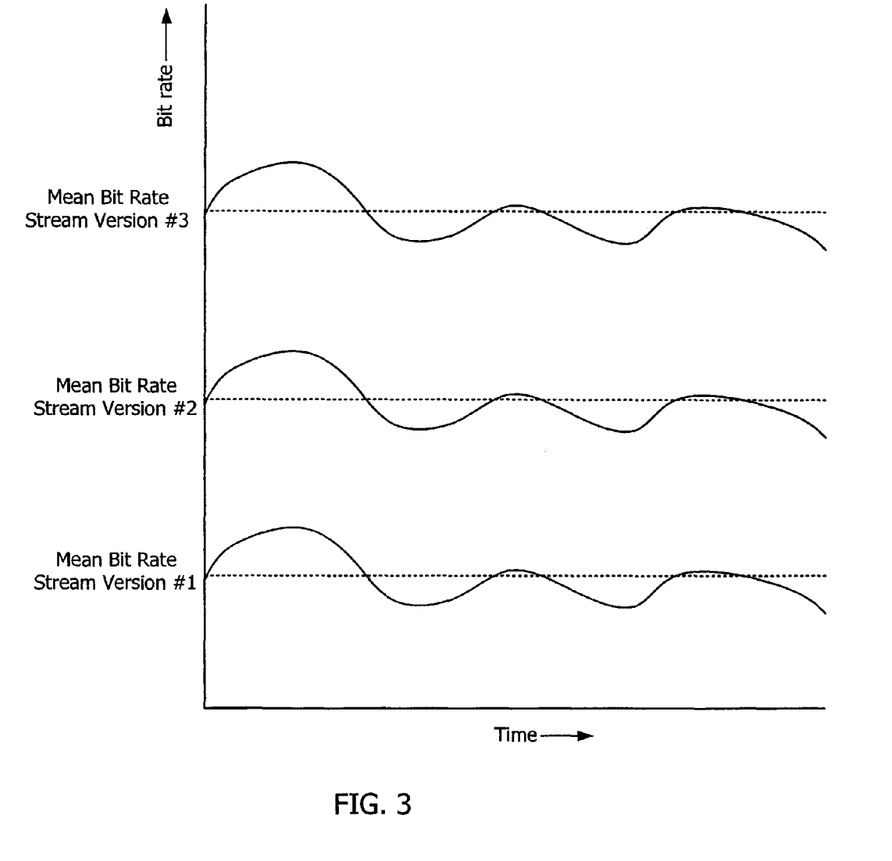
FIG. 3 is a graph illustrating various versions of a stream of variable bit rate data, particularly illustrating different mean bit rates of the various versions of the stream.

Three exemplary versions of a single bit stream are shown in FIG. 3. Each version of the stream has a bit rate that varies with time. The versions are all synchronized with one another, i.e. the bit rates all increase at the same time or all decrease by the same time. However, the mean bit rates of the various versions of the stream differ from one another. The server performs up-switches and down-switches by switching between the different versions of the stream. In the example if FIG. 3, only three versions of the stream are shown. Typically, more versions are pre-stored. Also, in the example, the lowest bit rate of the highest bit rate version 205 of the stream is at a higher rate than the highest bit rate of the next version 207 of the stream. Likewise, the lowest bit rate of version 205 of the stream is at a higher rate than the highest bit rate of version 209. This, however, need not be the case. Often there is at least some overlap in bit rates. Also, in the example, the rate changes are shown as being smooth, i.e. the rate increases smoothly to a peak then decreases smoothly. This need not be the case either. In many examples, the bit rates change discontinuously, i.e. the rate jumps from one level (such as 1 Mbit/sec) to a different level (such as 2 Mbit/sec).

Returning to FIG. 2, the selected version of the stream is transmitted at step 202 from the server to the client by taking pre-encoded data from the version of the stream and placing that pre-encoded data into data packets, which are transmitted at a predetermined packet transmission rate to the client. Note that any change in the bit rate of the variable bit rate data within a stream being transmitted does not typically require a change in the packet transmission rate, which is determined base upon bandwidth considerations. Likewise, the choice of one version of the stream over another version typically does not entail any changes in packet transmission rate.

At step 204, the server tracks a value representative of the amount of data currently within the client buffer. This too may be performed in accordance with otherwise conventional techniques. In one example, if the client buffer is implemented in accordance with RTCP protocols, the server receives feedback from the client buffer, which includes the NSN/OBSN and HRSN data fields from which the amount of data in the client buffer is determined. As noted, the amount of data in the client buffer may be represented, for example, in terms of a playout length (PT), a client buffer fill level, or other appropriate value. In the following descriptions, examples will be described using playout length (PT).

At step 206, the server determines the bit rate (BR) of a portion of the variable bit rate data yet to be transmitted. Preferably, it is the next sequential portion of data to be transmitted that the server examines, i.e. the server determines a value ($BR_{NEXT}$) representative of the bit rate of the next portion of data to be transmitted. The next portion of data may be defined, for example, in terms of a predetermined number of seconds worth of data to be transmitted or may be defined as that portion of data from the data currently being transmitted until a next preset change in the data. For example, if the pre-encoded stream of variable bit rate data is to maintain its current bit rate for the next 12 seconds before switching to another bit rate, then the next portion of data comprises the next 12 seconds worth of data.

Figure 4:
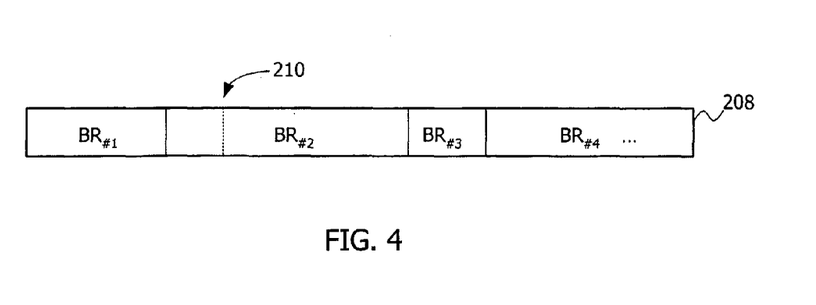
FIG. 4 is a block diagram of a single stream of variable bit rate data, particularly illustrating bit rates of various portions of the stream.

FIG. 4 illustrates an exemplary version 208 of a stream of variable bit rate data being transmitted. The stream includes portions of differing bit rates, denoted $BR_{\#1}$, $BR_{\#2}$, $BR_{\#3}$, $BR_{\#4}$ etc. $BR_{\#1}$ and $BR_{\#3}$ may both be, for example, 1 Mbit/second, whereas $BR_{\#2}$ and $BR_{\#4}$ may both be, for example, 2 Mbits/second. As can be seen, portions may be of different lengths, i.e. durations. In the example, arrow 210 denotes the point within the stream corresponding to data currently being transmitted. The next portion of data, therefore, is data commencing at point 210. The rate of that data is $BR_{\#2}$. If the next portion of data is defined in terms of that portion of data from the data currently being transmitted until a next preset change in the data, then $BR_{NEXT}$ is simply $BR_{\#2}$. If, instead, the next portion of data is defined in terms of a predetermined number of seconds' worth of data to be transmitted, then the next portion of data may encompass two or more different bit rates. In that case, the server may be configured to simply select the first of those bit rates for use as $BR_{NEXT}$ or may instead be configured to calculate the average bit rate $BR_{AVE}$ over that predetermined period of time for use as $BR_{NEXT}$. In any case, a value representative of the bit rate of some portion of data yet to be transmitted is determined at step 206 of FIG. 2.

At step 212 of FIG. 2, the server then controls switches to different versions of the steam, having the different mean bit rates, based on the value (PT) representative of the amount of data currently within the client buffer and based on the bit rate (BR) of the portion of variable bit rate data yet to be transmitted, e.g. the server controls up-switches and down-switches based upon both PT and $BR_{NEXT}$. By taking into account the bit rate of data yet to be transmitted, in addition to PT, the server is capable of avoiding many of the unnecessary rate switches that occur in conventional systems employing only fixed rate switched thresholds.

Preferably, if $BR_{NEXT}$ exceeds $BR_{AVE}$, any up-switch due to a change in the status of client buffer is delayed. In other words, if any increase in playout length within the client buffer would otherwise have triggered a switch to a different version of the stream having a generally higher transmission rate, that switch is delayed. If an up-switch were instead performed by the server prior to a point in the stream where the variable bit rate was due to increase anyway, the up-switch would likely be counterproductive and might necessitate a compensatory down-switch. In this regard, by performing an up-switch prior to a point in the stream where the bit rate of the variable bit rate stream increases, two bit rate increases thereby occur, one after the other. As a result, the bit rate is then probably higher than necessary, likely triggering a compensatory down-switch to prevent possible buffer drainage. By instead delaying an up-switch in circumstances where the bit rate of variable bit rate data is due to increase anyway, the server likely avoids both an unnecessary up-switch and a subsequent compensatory down-switch, thereby providing a more consistent level of media quality to the end-user.

Also preferably, if $BR_{NEXT}$ exceeds $BR_{AVE}$, down-switch due to a change in the status of client buffer is expedited. In other words, if a decrease in playout length within the client buffer would otherwise have triggered a switch to a different version of the stream having a generally lower transmission rate, that switch is expedited if the variable bit rate is due to increase. By expediting the down-switch in circumstances where the bit rate of the data being transmitted is due to increase, the server thereby helps prevent a possible rebuffering event. If, on the other hand, the server did not anticipate the increase in bit rate within the variable bit rate data, a down-switch triggered by the playout length falling below the conventional fixed down-switch threshold ($PT_{DOWN}$) might be too late to prevent rebuffering given that the increasing bit rate of the stream itself will accelerate buffer drainage.

Preferably, if $BR_{NEXT}$ is instead below $BR_{AVE}$, any up-switch due to a change in the status of client buffer is expedited. In other words, if an increase in playout length within the client buffer would otherwise have triggered a switch to a different version of the stream having a generally higher transmission rate, that switch is expedited if the variable bit rate is due to decrease. By expediting the up-switch in circumstances where the bit rate of the data being transmitted is due to decrease, the server thereby helps prevent a possible overflow event. If, on the other hand, the server did not anticipate the decrease in bit rate within the variable bit rate data, an up-switch triggered by the playout length exceeding the conventional fixed up-switch threshold ($PT_{UP}$) might be too late to prevent buffer overflow given that the decreasing bit rate of the stream itself will accelerate buffer overflow. Moreover, the expedited up-switch provides improved media quality to the user more promptly.

Note however, that when $BR_{NEXT}$ is below $BR_{AVE}$, any down-switch due to a change in the status of client buffer is preferably not delayed (nor expedited). Rather, in that case, down-switches are preferably triggered based on the conventional fixed down-switch threshold ($PT_{DOWN}$). Although a down-switch could potentially be delayed in view of the fact that the bit rate of the variable bit rate data is due to decrease soon anyway, such is not performed in the preferred implementation of invention so as to avoid risk of buffer drainage.

Figure 5:
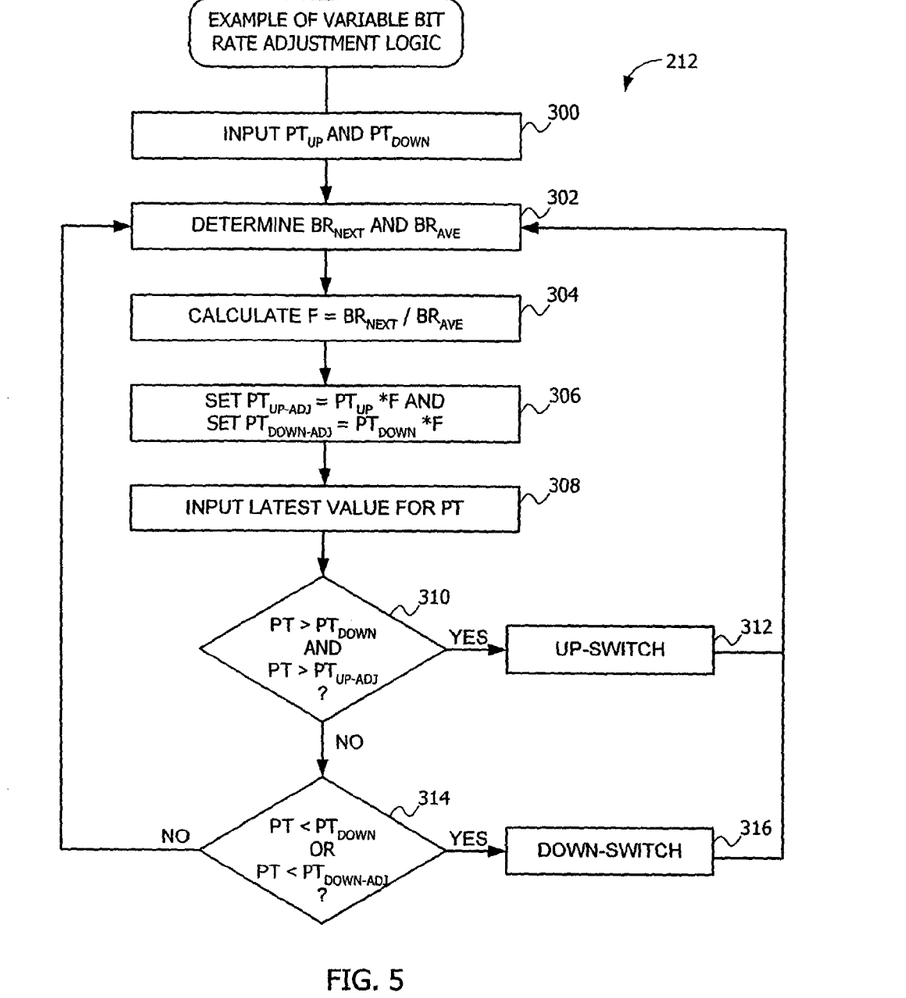
FIG. 5 is a process flow diagram illustrating an exemplary implementation of variable bit rate logic of the invention.

Turning now to FIG. 5, a preferred implementation of variable bit rate logic for use at step two 212 of FIG. 2 will now be described. Beginning at step 300, the server determines values for $PT_{UP}$ and $PT_{DOWN}$. $PT_{UP}$ and $PT_{DOWN}$ may be predetermined, fixed up-switch and down-switch thresholds and may be set in accordance with otherwise conventional techniques. At step 302, the server determines values for $BR_{NEXT}$ and $BR_{AVE}$. $BR_{NEXT}$ may be determined by examining the encoded bit rates associated with data to be transmitted, which is stored within the server or otherwise accessible by the server. In one example, $BR_{AVE}$ is calculated by examining a record of the encoded bit rates of data already transmitted (along the durations of time during which packets containing the data encoded at the various bit rates were transmitted.) Otherwise routine arithmetic may be used to calculate the actual average. In a second example, a $BR_{AVE}$ value for the entire stream may be calculated and stored beforehand (as the individual streams are encoded before the streaming session starts, individual $BR_{AVE}$ values may be determined for the individual streams before play out.) In other words, in that second example, $BR_{AVE}$ is not the average bit rate of only that portion of data that has already been transmitted but instead represents the average over the entire stream, i.e. $BR_{AVE}$ is the mean bit rate illustrated, e.g., in FIG. 3.

At step 304, the server calculates a value F, which is representative of a ratio of $BR_{NEXT}$ to $BR_{AVE}$, i.e. $F=BR_{NEXT}/BR_{AVE}$. Hence, if $BR_{NEXT}$ exceeds $BR_{AVE}$, F is then greater than 1.0. If $BR_{NEXT}$ exceeds $BR_{AVE}$, F is then less than 1.0. In cases where $BR_{NEXT}$ is equal to $BR_{AVE}$, F is then equal to 1.0. If no data has yet been transmitted (such that there is no current value of $BR_{AVE}$), then F is simply set to 1.0. If no data remains to be transmitted within a current stream of data, such that there is no current value for $BR_{NEXT}$, then F is also preferably re-set to 1.0 for use in connection with a next stream of data to be transmitted.

At step 306, the server sets an adjustable up-switch threshold ($PT_{UP\text{-}ADJ}$) equal to $PT_{UP}$ multiplied by F, i.e. $PT_{UP}*F$, and also sets an adjustable down-switch threshold ($PT_{DOWN-ADJ}$) equal to $PT_{DOWN}$ multiplied by F, i.e. $PT_{DOWN}*F$. Hence, if $BR_{NEXT}$ exceeds $BR_{AVE}$, then $PT_{UP-ADJ}$ is greater than $PT_{UP}$ and $PT_{DOWN-ADJ}$ is also greater than $PT_{DOWN}$. Conversely, if $BR_{NEXT}$ is below $BR_{AVE}$, then $PT_{UP-ADJ}$ is less than $PT_{UP}$ and $PT_{DOWN-ADJ}$ is also less than $PT_{DOWN}$.

Figure 6:
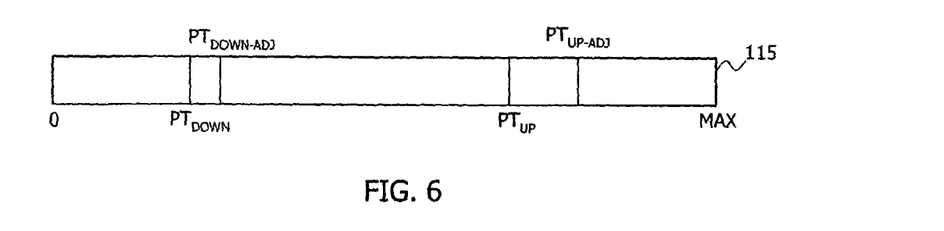
FIG. 6 is a block diagram of a client buffer, particularly illustrating various thresholds employed by the invention.

The thresholds are illustrated in FIG. 6, which provides a block diagram representation of client buffer 115 of FIG. 1. In the example of FIG. 6, the adjustable thresholds are greater than the corresponding fixed thresholds. Note that circumstances can potentially arise where $PT_{UP-ADJ}$ may be calculated to be greater than the maximum value of client buffer (MAX). This may occur if $BR_{NEXT}$ is quite a bit larger than $BR_{AVE}$, yielding a high value for F. If that is the case, than $PT_{UP-ADJ}$ is simply set equal to MAX or to some other lesser, default value. In the extremely unlikely case that $PT_{DOWN-ADJ}$ is also calculated to be greater than MAX due to an extremely high value for F, then $PT_{DOWN-ADJ}$ is preferably also set to some default value, which is less than the default value to which $PT_{UP-ADJ}$ is set, thus assuring that $PT_{DOWN-ADJ}$ remains less than $PT_{UP-ADJ}$.

Returning to FIG. 5, at step 308, the server begins determining values for PT, i.e. the current playout length of data already contained within the client buffer, tracked at step 204 of FIG. 2. If, at decision step 310, PT is greater than $PT_{DOWN}$ and PT is also greater than $PT_{UP-ADJ}$, then an up-switch is triggered at step 312. If not, then decision step 314 is performed wherein, if PT is less than $PT_{DOWN}$ or PT is less than $PT_{DOWN-ADJ}$, then a down-switch is triggered at step 316.

The logic of decision steps 310 and 316 may be represented as follows:

If PT>$PT_{DOWN}$ AND PT>$PT_{UP-ADJ}$ then
    Perform up-switch
else
if PT<$PT_{DOWN}$ OR PT<$PT_{DOWN-ADJ}$
    Perform down-switch
end if
where, as noted,
$PT_{UP-ADJ}=PT_{UP}*F$ and
$PT_{DOWN-ADJ}=PT_{DOWN}*F$.

Hence, an up-switch is triggered if the current playout length (PT) of the client buffer exceeds the adjustable up-switch threshold ($PT_{UP-ADJ}$), assuming that PT also exceeds $PT_{DOWN}$. This latter condition prevents inappropriate up-switches in circumstances where a down-switch may be more appropriate. By triggering up-switches based upon the adjustable up-switch threshold, rather than on the fixed up-switch threshold, the server thereby takes into account the current status of the client buffer (as represented by PT) while also anticipating changes in bit rate within the variable bit rate data stream (via the adjustment of the up-switch threshold). This helps prevent other inappropriate up-switches.

Consider an example wherein the adjustable up-switch threshold is initially exactly equal to the fixed up-switch threshold. Hence, if the playout length of client buffer exceeds that threshold level, an up-switch is performed. If the bit rate of the variable bit rate data is then due to increase, the adjustable up-switch threshold will be increased so as to the greater than the fixed threshold. In that case, a further up-switch will only be performed if the playout length exceeds the new, higher threshold value. In other words, it becomes more difficult for an up-switch to be triggered since a higher threshold value must be exceeded thus delaying further up-switches in circumstances where such a delay is warranted, as discussed above in connection with FIG. 1. Now consider an example wherein the adjustable up-switch threshold is again initially set equal to the fixed up-switch threshold but wherein the bit rate of the variable bit rate data is instead due to decrease. In the case, the adjustable up-switch threshold will then be lower than the fixed threshold. In that case, it becomes easier for an up-switch to be triggered thus expediting further up-switches in circumstances where one is warranted, as also discussed above.

Turning now to down-switches, a down-switch is triggered if the current playout length (PT) of the client buffer falls below either the fixed threshold $PT_{DOWN}$ or the adjustable down-switch threshold ($PT_{DOWN-ADJ}$). In other words, a down-switch is triggered if PT falls below the larger of the two down-switch thresholds. The fixed threshold is still used to trigger a down-switch so as to prevent a down-switch from being delayed so as to help prevent rebuffering events. However, a down-switch can be expedited, which occurs if PT falls below the adjustable down-switch threshold. As noted above, the adjustable down-switch threshold may turn out to be either above or below the fixed down-switch threshold. If it is below the fixed threshold, it is superfluous, as the fixed threshold is used to immediately trigger a down-switch anyway. However, if the adjustable down-switch threshold exceeds the fixed down-switch threshold, the adjustable down-switch threshold can then trigger an expedited down-switch, i.e. it becomes easier for a down-switch to be triggered thus expediting further down-switches in circumstances where warranted, as also discussed above.

If neither of the conditions of decision steps 310 and 314 are true, then processing returns to step 302, wherein the values of $BR_{NEXT}$ and $BR_{AVE}$ are updated to reflect any changes therein, the adjustable thresholds are adjusted and the latest value for PT is input for applying to the various threshold values.

Thus, an exemplary method implementation has been described of a technique for adjusting the overall transmission rate of data in a packet-based system by switching among different versions of a pre-encoded stream. The packet transmission rate typically is not changed, as it depends upon the bandwidth of the communication link. However, in other implementations, the packet transmission rate may be changed as well using, for example, adaptive techniques.

Figure 7:
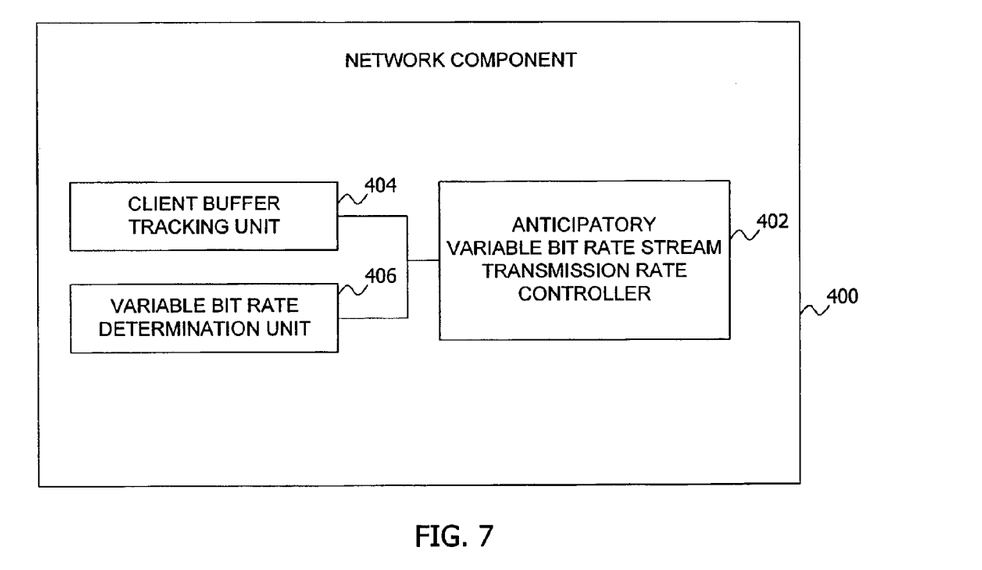
FIG. 7 is a block diagram illustrating an exemplary apparatus implementation of a server component of the invention.

Although the invention has been primarily described with reference to method implementations, apparatus implementations are also part of the invention. FIG. 7 illustrates, at a high-level, an exemplary apparatus implementation. Briefly, network component 400, which may be a part of server 105 of FIG. 1, includes an anticipatory variable bit rate stream transmission controller (402) for selecting (202) an initial version of a stream of variable bit rate data for transmission. A client buffer monitor (404) tracks a value representative of an amount of data within the client buffer. A variable bit rate determination unit (406) determines a bit rate (BR) of a portion of variable bit rate data yet to be transmitted within the selected version of the stream. The anticipatory variable bit rate stream transmission controller (402) then controls switches to different versions of the stream, having different mean bit rates, based on the value (PT) representative of the amount of data within the client buffer in combination with the bit rate (BR) of the portion of variable bit rate data yet to be transmitted, i.e. controller 402 anticipates changes in bit rate of the variable bit rate stream and controls up-switches and down-switches accordingly.

As can be appreciated by one of ordinary skill in the art, the current invention and the techniques associated therewith provide an enhanced end user perceived experience for applications such as multimedia streaming by avoiding client buffer overflows. Furthermore, the skilled artisan will also appreciate that there are many different techniques that may be used to determine client buffer fill levels, including estimations based on data within RRs and Sender Reports, and that the current invention may be implemented in parallel with a plurality of data packet streams simultaneously being buffered for transmission to one or more clients.

One of ordinary skill in the art will further appreciate that the invention may be implemented in and by various types of network components, such as network terminals, network nodes, and the like. In particular, the invention may be practiced by mobile terminals, proxies (that could divide the transmission path), and fixed terminals.

While the invention has been described with respect to particular embodiments, those skilled in the art will recognize that the invention is not limited to the specific embodiments described and illustrated herein. Therefore, while the invention has been described in relation to its preferred embodiments, it is to be understood that this disclosure is only illustrative. Accordingly, it is intended that the invention be limited only by the scope of the claims appended hereto.

The invention claimed is:

1. A method for controlling packet transmissions of variable bit rate data from a server to a client having a client buffer, wherein the server switches among different versions of a stream of variable bit rate data being transmitted based on a status of the client buffer, the method comprising the steps of:
   selecting an initial version of a stream of variable bit rate data for transmission;
   tracking a value representative of an amount of data within the client buffer;
   determining a bit rate of a portion of variable bit rate data yet to be transmitted within the selected version of the stream; and
   controlling switches to different versions of the stream, having different mean bit rates, based on the value representative of the amount of data within the client buffer in combination with the bit rate of the portion of variable bit rate data yet to be transmitted.

2. The method of claim 1, wherein the step of controlling switches includes the step of:
   if a bit rate of a next portion of variable bit rate data to be transmitted exceeds an average bit rate, then delaying a switch to a version of the stream having a generally higher mean bit rate.

3. The method of claim 1, wherein the step of controlling switching includes the step of:
   if a bit rate of a next portion of variable bit rate data to be transmitted exceeds an average bit rate, then expediting a switch to a version of the stream having a generally lower mean bit rate.

4. The method of claim 1, wherein the step of controlling switching includes the step of:
   if a bit rate of a next portion of variable bit rate data to be transmitted is below an average bit rate, then expediting a switch to a version of the stream having a generally higher mean bit rate.

5. The method of claim 1, wherein the server controls switches to different versions of the stream based on a current status of the client buffer by applying one or more thresholds to data already in the client buffer and wherein the step of controlling switching comprises:
   dynamically adjusting the one or more thresholds based on the bit rate of the portion of variable bit rate data to be transmitted; and
   determining whether to switch to a different version of the stream based on the current status of the client buffer by applying one or more adjustable thresholds to the value representative of the amount of data within the client buffer.

6. The method of claim 5, wherein the one or more thresholds includes at least one of an up-switch threshold and a down-switch threshold.

7. The method of claim 6, wherein the step of dynamically adjusting the one or more thresholds includes the steps of:
   determining an average bit rate of the variable bit rate data; and
   selectively adjusting the up-switch and down-switch thresholds based on a comparison of a bit rate of a next portion of variable bit rate data to be transmitted with an average bit rate of the variable bit rate data.

8. The method of claim 7, wherein the step of selectively adjusting the up-switch and down-switch thresholds includes the steps of:
   increasing the up-switch and down-switch thresholds if the bit rate of the next portion of variable bit rate data exceeds the average bit rate; and
   decreasing the up-switch threshold if the bit rate of the next portion of the variable bit rate data is below the average bit rate and if the up-switch threshold exceeds the down-switch threshold.

9. The method of claim 8, wherein the step of increasing the up-switch and down-switch thresholds if the bit rate of the next portion of variable bit rate data exceeds the average bit rate includes the steps of:
   determining the bit rate of the next portion of variable bit rate data;
   calculating a ratio of the bit rate of the next portion of variable bit rate data to the average bit rate; and
   multiplying the up-switch and down-switch thresholds by the ratio to thereby increase the thresholds.

10. The method of claim 8, wherein the step of decreasing the up-switch threshold includes the steps of:
    determining the bit rate of the next portion of variable bit rate data;
    calculating a ratio of the bit rate of the next portion of variable bit rate data to the average bit rate;
    multiplying the up-switch threshold by the ratio to thereby decrease the threshold; and
    selecting the larger of the decreased up-switch threshold and the down-switch threshold for use as a new up-switch threshold.

11. The method of claim 2, wherein the average bit rate is representative of an average bit rate over the entire version of the stream being transmitted.

12. The method of claim 2, wherein the average bit rate is representative of an average bit rate of data that has already been transmitted within the version of the stream being transmitted.

13. The method of claim 1, wherein the value associated with data in the client buffer is representative of a playout length of the data.

14. The method of claim 1, wherein the value associated with data in the client buffer is representative of a buffer fill level of the data.

15. An apparatus, for controlling packet transmissions of variable bit rate data from a server to a client having a client buffer, wherein the server switches among different versions of a stream of variable bit rate data being transmitted based on a status of the client buffer, the apparatus comprising:
    an anticipatory variable bit rate stream transmission controller for selecting an initial version of a stream of variable bit rate data for transmission;

a client buffer monitor for tracking a value representative of an amount of data within the client buffer;

a variable bit rate determination unit a bit rate of a portion of variable bit rate data yet to be transmitted within the selected version of the stream; and wherein the anticipatory variable bit rate stream transmission controller then controls switches to different versions of the stream, having different mean bit rates, based on the value representative of the amount of data within the client buffer in combination with the bit rate of the portion of variable bit rate data yet to be transmitted.

16. The method of claim 1, wherein the selecting step, the tracking step, the determining step and the controlling step are implemented by the server.

17. The method of claim 1, wherein the selecting step, the tracking step, the determining step and the controlling step are implemented by a network component.

18. The apparatus of claim 15, wherein the apparatus is part of the server.

19. The apparatus of claim 15, wherein the apparatus is part of a network component.

20. A method for controlling packet transmissions of variable bit rate data from a server to a client having a client buffer, wherein the server switches among different versions of a stream of variable bit rate data being transmitted based on a status of the client buffer, the method comprising the steps of:

selecting an initial version of a stream of variable bit rate data for transmission;

tracking a value representative of an amount of data within the client buffer;

determining a bit rate of a portion of variable bit rate data yet to be transmitted within the selected version of the stream; and controlling switches to different versions of the stream, having different mean bit rates, based on the value representative of the amount of data within the client buffer in combination with the bit rate of the portion of variable bit rate data yet to be transmitted, wherein the step of controlling switches includes the steps of:

if a bit rate of a next portion of variable bit rate data to be transmitted exceeds an average bit rate, then delaying a switch to a version of the stream having a generally higher mean bit rate; and if a bit rate of a next portion of variable bit rate data to be transmitted exceeds an average bit rate, then expediting a switch to a version of the stream having a generally lower mean bit rate.

21. An apparatus for controlling packet transmissions of variable bit rate data from a server to a client having a client buffer, wherein the server switches among different versions of a stream of variable bit rate data being transmitted based on a status of the client buffer, the apparatus comprising:

an anticipatory variable bit rate stream transmission controller for selecting an initial version of a stream of variable bit rate data for transmission;

a client buffer monitor for tracking a value representative of an amount of data within the client buffer;

a variable bit rate determination unit a bit rate of a portion of variable bit rate data yet to be transmitted within the selected version of the stream; and wherein the anticipatory variable bit rate stream transmission controller then controls switches to different versions of the stream, having different mean bit rates, based on the value representative of the amount of data within the client buffer in combination with the bit rate of the portion of variable bit rate data yet to be transmitted;

wherein the anticipatory variable bit rate stream transmission controller controls switches to different versions of the stream as follows:

if a bit rate of a next portion of variable bit rate data to be transmitted exceeds an average bit rate, then delaying a switch to a version of the stream having a generally higher mean bit rate; and if a bit rate of a next portion of variable bit rate data to be transmitted exceeds an average bit rate, then expediting a switch to a version of the stream having a generally lower mean bit rate.

22. A method for controlling packet transmissions of variable bit rate data from a server to a client having a client buffer, wherein the server switches among different versions of a stream of variable bit rate data being transmitted based on a status of the client buffer, the method comprising the steps of:

selecting an initial version of a stream of variable bit rate data for transmission;

tracking a value representative of an amount of data within the client buffer;

determining a bit rate of a portion of variable bit rate data yet to be transmitted within the selected version of the stream; and controlling switches to different versions of the stream, having different mean bit rates, based on the value representative of the amount of data within the client buffer in combination with the bit rate of the portion of variable bit rate data yet to be transmitted;

wherein the server controls switches to different versions of the stream based on a current status of the client buffer by applying one or more thresholds to data already in the client buffer and wherein the step of controlling switching comprises:

dynamically adjusting the one or more thresholds based on the bit rate of the portion of variable bit rate data to be transmitted; and determining whether to switch to a different version of the stream based on the current status of the client buffer by applying one or more adjustable thresholds to the value representative of the amount of data within the client buffer;

wherein the one or more thresholds includes at least one of an up-switch threshold and a down-switch threshold;

wherein the step of dynamically adjusting the one or more thresholds includes the steps of:

determining an average bit rate of the variable bit rate data; and selectively adjusting the up-switch and down-switch thresholds based on a comparison of a bit rate of a next portion of variable bit rate data to be transmitted with an average bit rate of the variable bit rate data;

wherein the step of selectively adjusting the up- switch and down-switch thresholds includes the steps of:

increasing the up-switch and down-switch thresholds if the bit rate of the next portion of variable bit rate data exceeds the average bit rate; and decreasing the up-switch threshold if the bit rate of the next portion of the variable bit rate data is below the average bit rate and if the up-switch threshold exceeds the down-switch threshold.

23. An apparatus for controlling packet transmissions of variable bit rate data from a server to a client having a client buffer, wherein the server switches among different versions of a stream of variable bit rate data being transmitted based on a status of the client buffer, the apparatus comprising:
- an anticipatory variable bit rate stream transmission controller for selecting an initial version of a stream of variable bit rate data for transmission;
- a client buffer monitor for tracking a value representative of an amount of data within the client buffer;
- a variable bit rate determination unit a bit rate of a portion of variable bit rate data yet to be transmitted within the selected version of the stream; and
- wherein the anticipatory variable bit rate stream transmission controller then controls switches to different versions of the stream, having different mean bit rates, based on the value representative of the amount of data within the client buffer in combination with the bit rate of the portion of variable bit rate data yet to be transmitted;
- wherein the anticipatory variable bit rate stream transmission controller controls switches to different versions of the stream based on a current status of the client buffer by applying one or more thresholds to data already in the client buffer and wherein the controlling switches comprises:
  - dynamically adjusting the one or more thresholds based on the bit rate of the portion of variable bit rate data to be transmitted; and
  - determining whether to switch to a different version of the stream based on the current status of the client buffer by applying one or more adjustable thresholds to the value representative of the amount of data within the client buffer;
- wherein the one or more thresholds includes at least one of an up-switch threshold and a down-switch threshold;
- wherein the dynamically adjusting the one or more thresholds includes:
  - determining an average bit rate of the variable bit rate data; and
  - selectively adjusting the up-switch and down-switch thresholds based on a comparison of a bit rate of a next portion of variable bit rate data to be transmitted with an average bit rate of the variable bit rate data;
- wherein the selectively adjusting the up- switch and down-switch thresholds includes:
  - increasing the up-switch and down-switch thresholds if the bit rate of the next portion of variable bit rate data exceeds the average bit rate; and
  - decreasing the up-switch threshold if the bit rate of the next portion of the variable bit rate data is below the average bit rate and if the up-switch threshold exceeds the down-switch threshold.

* * * * *